United States Patent
Hinchliffe et al.

(10) Patent No.: US 7,440,471 B1
(45) Date of Patent: Oct. 21, 2008

(54) SYSTEM AND METHOD FOR FACILITATING IPV6 PROTOCOL USAGE BY AN APPLICATION PROGRAM

(75) Inventors: Alex Hinchliffe, Milton Kevnes (GB); Fraser Peter Howard, Chipping Norton (GB); Igor G. Muttik, Berkhamsted (GB); Mark D. Harris, Banbury (GB)

(73) Assignee: McAfee, Inc., Santa Clara, CA (US)

( * ) Notice: Subject to any disclaimer, the term of this patent is extended or adjusted under 35 U.S.C. 154(b) by 1342 days.

(21) Appl. No.: 10/124,955

(22) Filed: Apr. 17, 2002

(51) Int. Cl.
*H04J 3/16* (2006.01)
(52) U.S. Cl. .................................. 370/466
(58) Field of Classification Search ......... 370/465–466, 370/469, 395.5–395.54
See application file for complete search history.

(56) References Cited

U.S. PATENT DOCUMENTS

| | | | | |
|---|---|---|---|---|
| 6,038,233 A | * | 3/2000 | Hamamoto et al. | 370/401 |
| 6,708,219 B1 | * | 3/2004 | Borella et al. | 709/245 |
| 7,006,526 B1 | * | 2/2006 | Biederman | 370/466 |
| 2001/0048686 A1 | | 12/2001 | Takeda et al. | 370/401 |
| 2002/0073215 A1 | * | 6/2002 | Huitema et al. | 709/230 |
| 2002/0093960 A1 | * | 7/2002 | Tsuchiya et al. | 370/390 |
| 2003/0048804 A1 | * | 3/2003 | Inouchi et al. | 370/466 |
| 2005/0249213 A1 | * | 11/2005 | Higuchi et al. | 370/390 |

FOREIGN PATENT DOCUMENTS

WO    01/22664    3/2001

OTHER PUBLICATIONS

Deering, S. et al., "RFC 1883-Internet Protocol, Version 6 (IPv6) Specification", http://www.faqs.org/rfcs/rfc1883, Dec. 1995.

* cited by examiner

*Primary Examiner*—Chi H. Pham
*Assistant Examiner*—Thai D. Hoang
(74) *Attorney, Agent, or Firm*—Zilka-Kotab, PC; Christopher J. Hamaty

(57) ABSTRACT

A system, method and computer program product are provided for translating between Internet Protocols (IP's). Initially, data is received over the Internet utilizing a first IP. Such data is adapted for being processed by an application program. Next, it is determined whether the application program can process data received over the Internet utilizing the first IP. If it is determined that the application program can not process data received over the Internet utilizing the first IP, the data is converted from the first IP to a second IP that the application program is capable of processing.

6 Claims, 7 Drawing Sheets

SYSTEM AND METHOD FOR FACILITATING IPV6 PROTOCOL USAGE BY AN APPLICATION PROGRAM

FIELD OF THE INVENTION

The present invention relates to network communications, and more particularly to Internet communications.

BACKGROUND OF THE INVENTION

Recent years have seen rapid proliferation of Internet and mobile communication services. Communications over the Internet are carried out by transmitting IP packets according to the de facto standard IP protocol (Internet Protocol, RFC 791). To each equipment connected to the Internet, an IP address unique in itself is assigned for identification thereof, and IP packet routing is performed using each unique IP address.

Upon receipt of an IP packet, a node apparatus checks a destination IP address contained in a header of the IP packet. If a terminal having the destination IP address is not found in the node apparatus, the IP packet is transferred to a node adjacent thereto using a routing table which provides correspondence relationships of IP addresses and adjacent nodes.

In the late 1970s when the currently used version of the Internet Protocol (IPv4) address space was designed, it was unimaginable that it could be outdated. However, due to changes in technology and an allocation practice that did not anticipate the recent explosion of hosts on the Internet, the IPv4 address space was consumed to the point that by 1992 it was clear a replacement would be necessary.

Due to recent concerns over the impending depletion of the current pool of Internet addresses and the desire to provide additional functionality for modern devices, an upgrade of IPv4 is in the process of standardization. This new version, called IP Version 6 (IPv6) resolves unanticipated IPv4 design issues and is poised to take the Internet into the 21st Century. Internet Protocol version 6 (IPv6) is the next generation of network layer protocols for the Internet and represents the future of networking.

The most obvious distinguishing feature of IPv6 is its use of much larger addresses. The size of an address in IPv6 is 128 bits, which is four times larger than an address in IPv4 (32-bit). This has a dramatic affect upon the number of possible addresses. See Table 1.

TABLE 1

| | |
|---|---|
| 32-bit | 4,294,967,296 addresses |
| 128-bit | $3.4 \times 10^{38}$ addresses |

IPv4 addresses are represented in a "dotted-decimal" format, 32-bit addresses divided along 8-bit boundaries. IPv6 addresses are represented in dotted-decimal format, 128-bit addresses divided along 16-bit boundaries. The more customary format of the IP address is then generated by converting each bit set into its decimal (IPv4) or hexadecimal (IPv6) equivalent. For example: 192.168.100.12 and 21DA:00D3:0000:2F3B:02AA:00FF:FE28:9C5A.

Current gateway application programs (i.e. security programs, network analyzers, etc.) only have functionality capable of dealing with IPv4 addresses. However, most underlying operating systems, (i.e. Windows 2000 Server, Linux/Unix, etc.) are capable of handling IPv6 addresses with some minor configuration and/or installation.

There is thus a need for a technique to facilitate the processing of data communicated with IPv6 using an application program.

DISCLOSURE OF THE INVENTION

A system, method and computer program product are provided for translating between Internet Protocols (IP's). Initially, data is received over the Internet utilizing a first IP. Such data is adapted for being processed by an application program. Next, it is determined whether the application program can process data received over the Internet utilizing the first IP. If it is determined that the application program can not process data received over the Internet utilizing the first IP, the data is converted from the first IP to a second IP that the application program is capable of processing.

In one aspect of the present embodiment, the first IP includes Internet Protocol Version-6 (IPv6) and the second IP includes Internet Protocol Version-4 (IPv4). Further, the processing may include scanning for viruses.

In another aspect of the present embodiment, if it is determined that the application program can process data received over the Internet utilizing the first IP, the data received over the Internet is processed utilizing the first IP. Moreover, if it is determined that the application program can not process data received over the Internet utilizing the first IP, the converted data received over the Internet data is processed utilizing the second IP.

Another system, method and computer program product are provided for translating between Internet Protocols (IP's). Initially, data is received over the Internet for being processed by an application program. It is then determined whether the data is received over the Internet utilizing a first IP or a second IP. If it is determined that the data is received over the Internet utilizing the first IP, the data is processed utilizing the first IP. Further, if it is determined that the data is received over the Internet utilizing the second IP, the data is processed utilizing the second IP.

Still another system, method and computer program product are provided for entering an Internet Protocol (IP) address when setting configuration data associated with an application program. At least one character is initially received from a user. An IP address is then guessed based on the at least one character. The guessed IP address is then displayed for selection by the user.

In one aspect of the present embodiment, the at least one character may be received in an IP address field of a configuration interface. Such configuration interface may be displayed upon the execution of the application program.

In another aspect of the present embodiment, the at least one character may include the beginning numerals of an IP address. Further, the IP address may include an IPv6 address. Still yet, the IP address may include an IPv6 address or higher.

In still another aspect of the present embodiment, the IP address may be guessed by determining whether the at least one character matches at least one corresponding character of an IP address stored in a cache, a host file, or a table on a domain name service (DNS) server. The guessed IP address may be displayed utilizing a drop-down menu, and applied as configuration data upon the selection thereof by the user.

DESCRIPTION OF THE PREFERRED EMBODIMENTS

Figure 1:
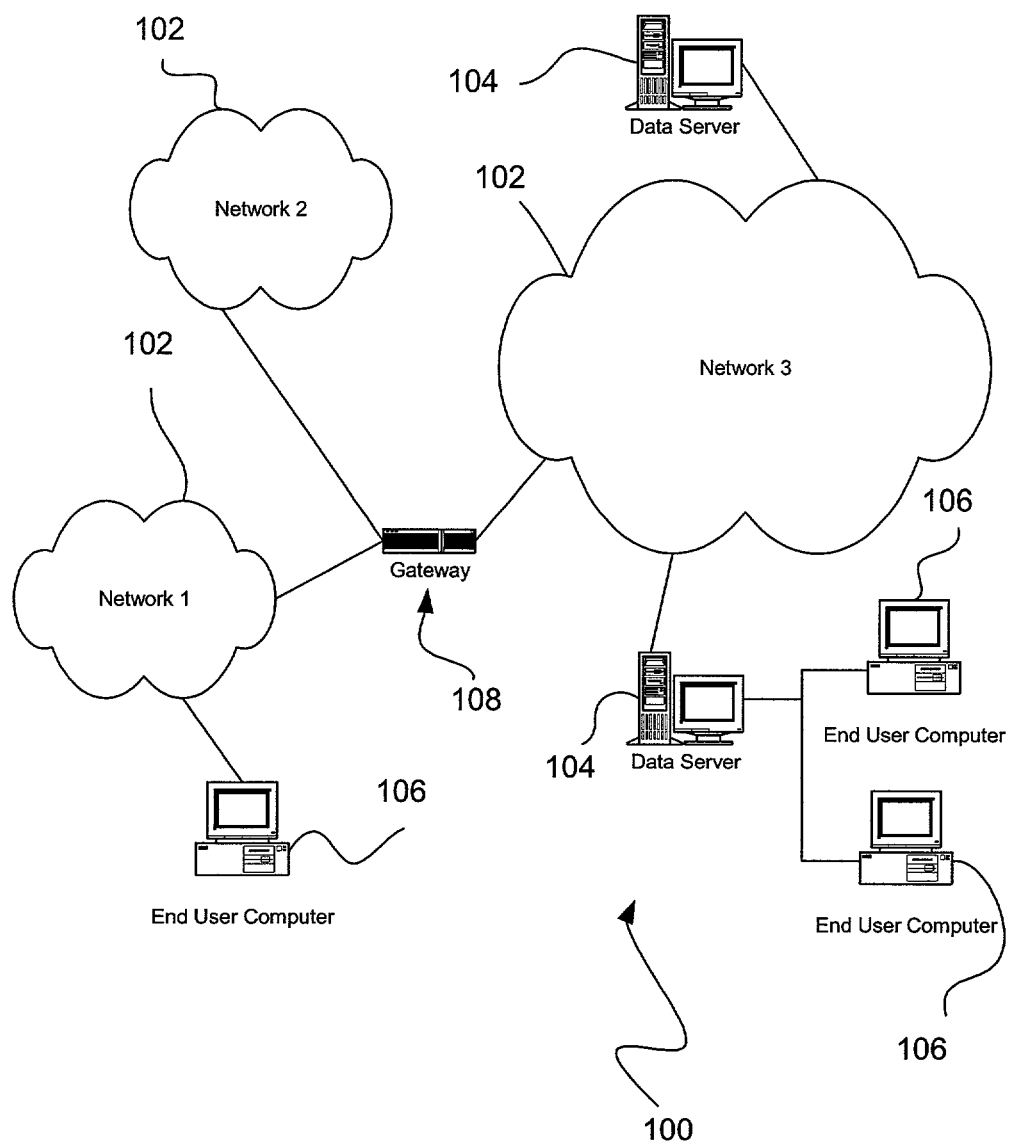
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway 108 is coupled therebetween. It should be noted that each of the foregoing network devices as well as any other unillustrated devices may be interconnected by way of a plurality of network segments.

Coupled to any one of the foregoing components and/or segments may be an application program. In the context of the present description, this application program may include a security application program, a network analyzer application program, or any other type of application program that processes data communicated over the Internet. One exemplary network analyzer application program that may be used is the SNIFFER™ manufactured by NETWORK ASSOCIATES, INC™. One exemplary security application program that may be used is the WEBSHIELD™ manufactured by NETWORK ASSOCIATES, INC™.

Such application program is equipped with the ability to facilitate both the configuration thereof using Internet Protocol Version-6 (IPv6) addresses, as well process data communicated over the Internet using IPv6. More information relating to exemplary implementations of such functionality will be set forth hereinafter in greater detail.

Figure 2:
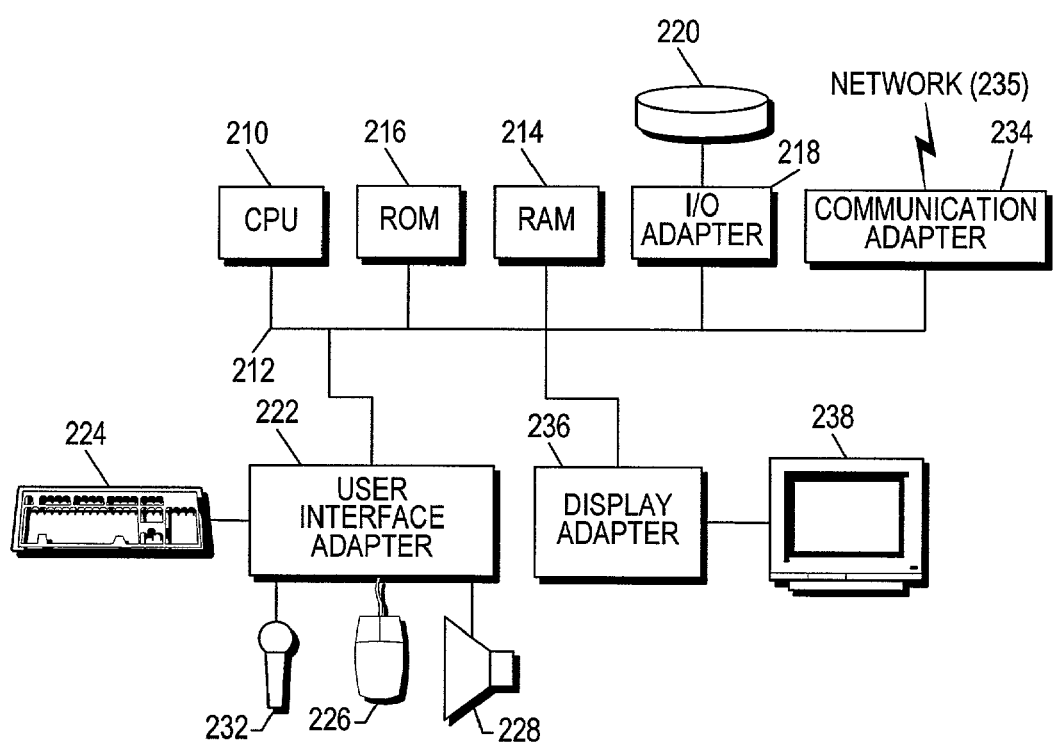
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
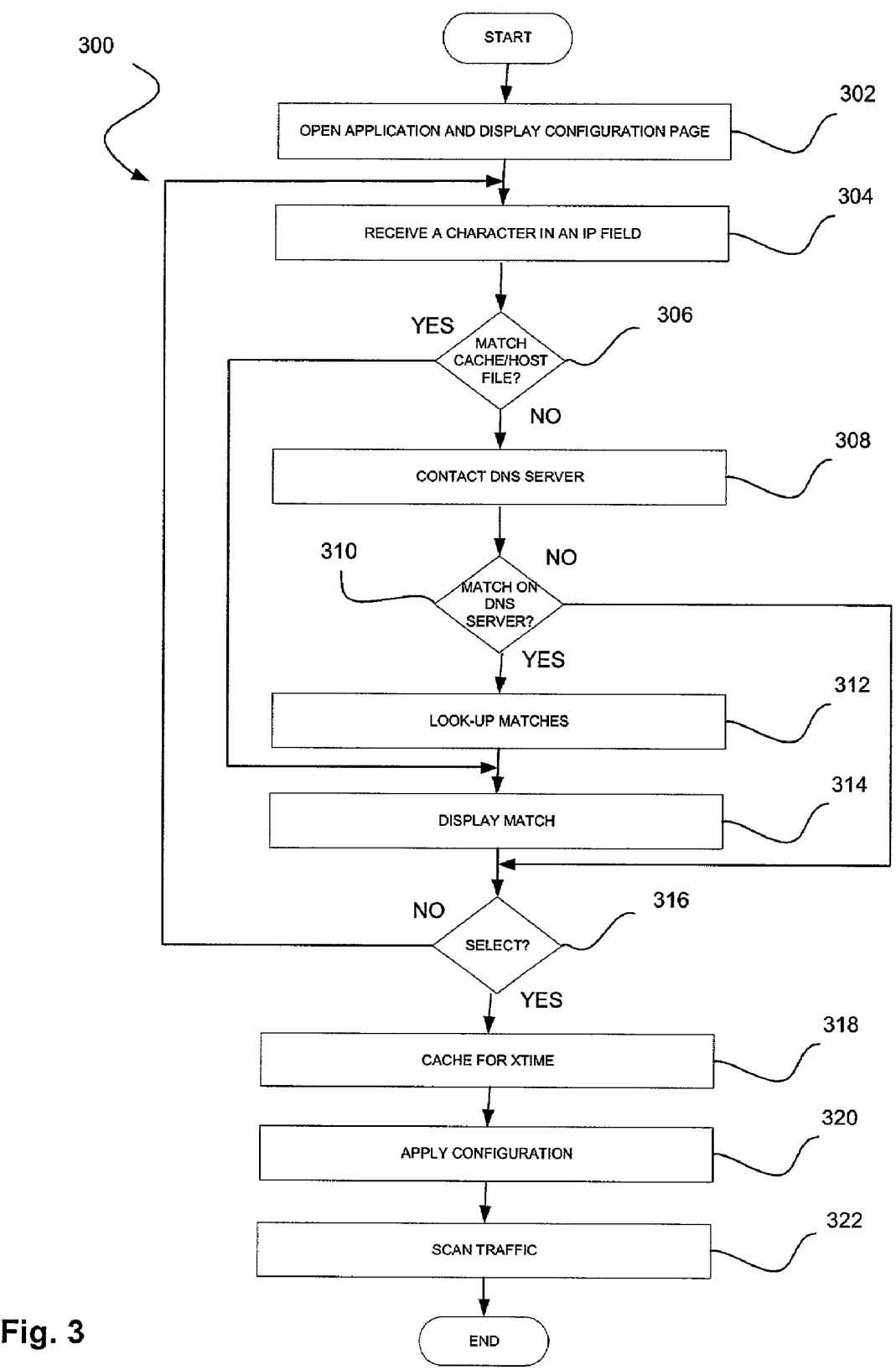
FIG. 3 illustrates a method for entering an Internet Protocol (IP) address when setting configuration data associated with an application program, in accordance with one embodiment.

FIG. 3 illustrates a method 300 for entering an IP address when setting configuration data associated with an application program, in accordance with one embodiment. In one embodiment, the method 300 may be implemented in the context of the aforementioned framework of FIGS. 1 and 2. Of course, the present method 300 may be implemented in any desired context.

Initially, an application program is installed and opened, or "initiated." See operation 302. In order for the application program to be run properly, it may first be configured. This is accomplished by displaying a configuration interface in response to the initiation of the application program, as indicated in operation 302. Such configuration interface may include an IP address field for receiving an IP address therein. Such IP address may includes an IPv4 or an IPv6 address.

Figure 4:
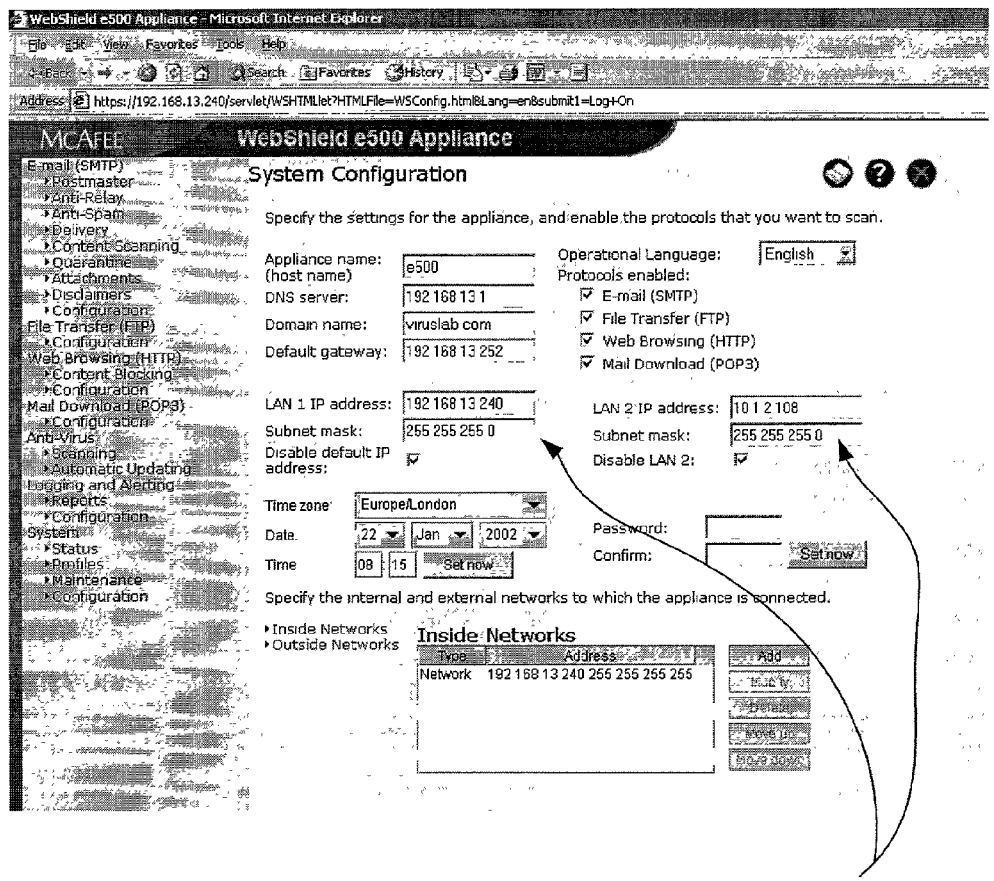
FIGS. 4 and 5 illustrate exemplary configuration interfaces with IP address fields for entry of IP addresses therein during a configuration process, in accordance with a couple exemplary embodiments.
Figure 5:
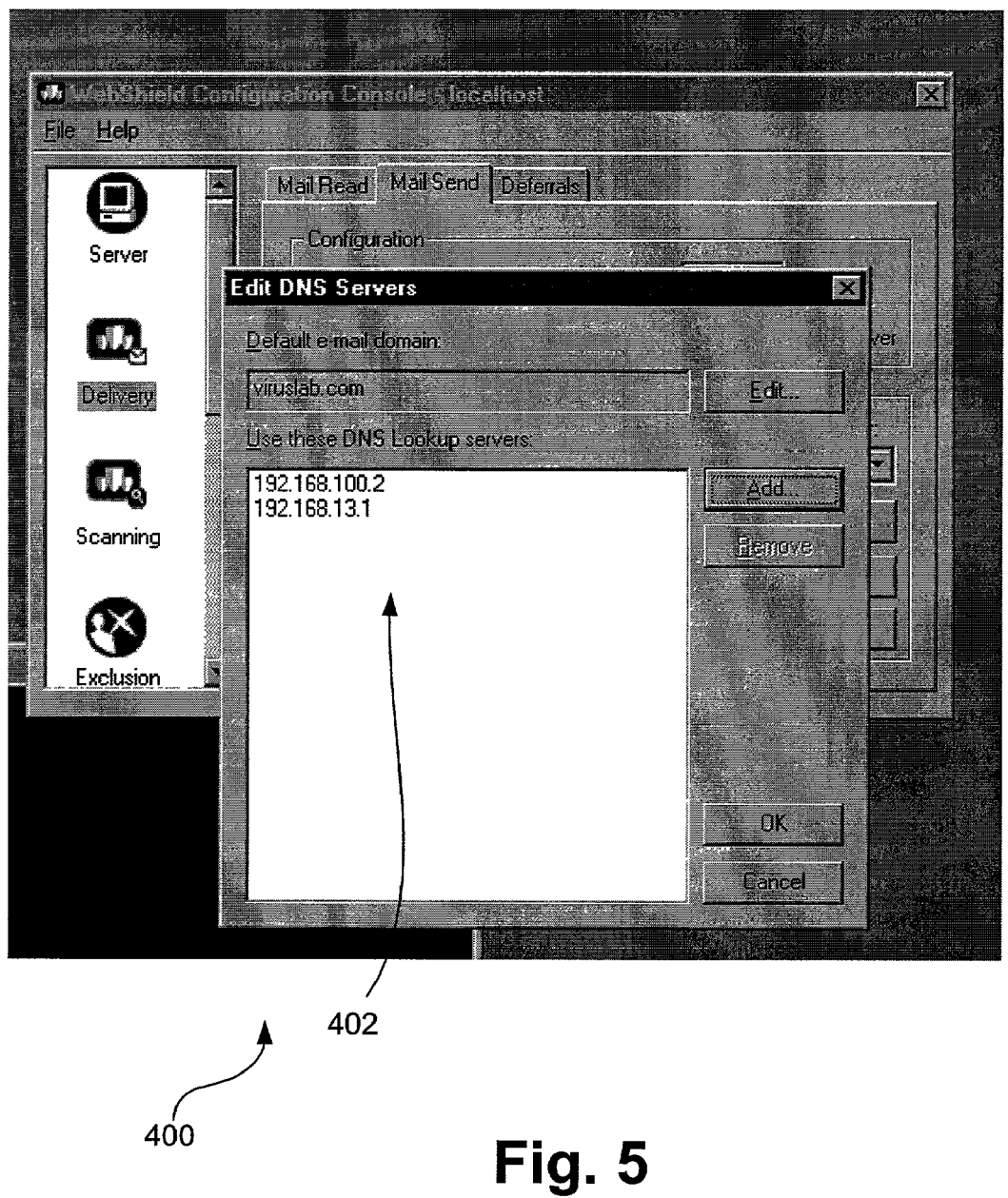

FIGS. 4 and 5 illustrate exemplary configuration interfaces 400 with IP address fields 402 for entry of IP addresses therein during a configuration process, in accordance with a couple exemplary embodiments. While IPv4 addresses are shown in such FIGS. 4 and 5, it should be noted that IPv6 addresses may readily be required in the IP address fields 402.

With continuing reference to FIG. 3, at least one character is received from a user in the IP address field of the configuration interface. Note operation 304. Such at least one character includes a numerical or alphanumerical character that represents a beginning n number of characters of an IP address.

As will soon become apparent, the IP address may have been previously entered or saved in a cache. Moreover, such IP address may be stored in a host file, which is well known to those of ordinary skill. Thus, during the present configuration process, in decision 306, it is determined whether the at least one character matches at least one corresponding character of an IP address stored in at least one of the cache or host file. This may be accomplished by a compare operation or the like.

Further, a domain name service (DNS) server is contacted in operation 308. This communication may be effected over a network. Once contacted, it may be determined in decision 310 whether the at least one character matches at least one corresponding character of an IP address in a mapping table stored on the DNS server. If it is determined in decision 310 that the at least one character renders a match, such match or matches may be looked up for display purposes in operation 312.

Figure 6:
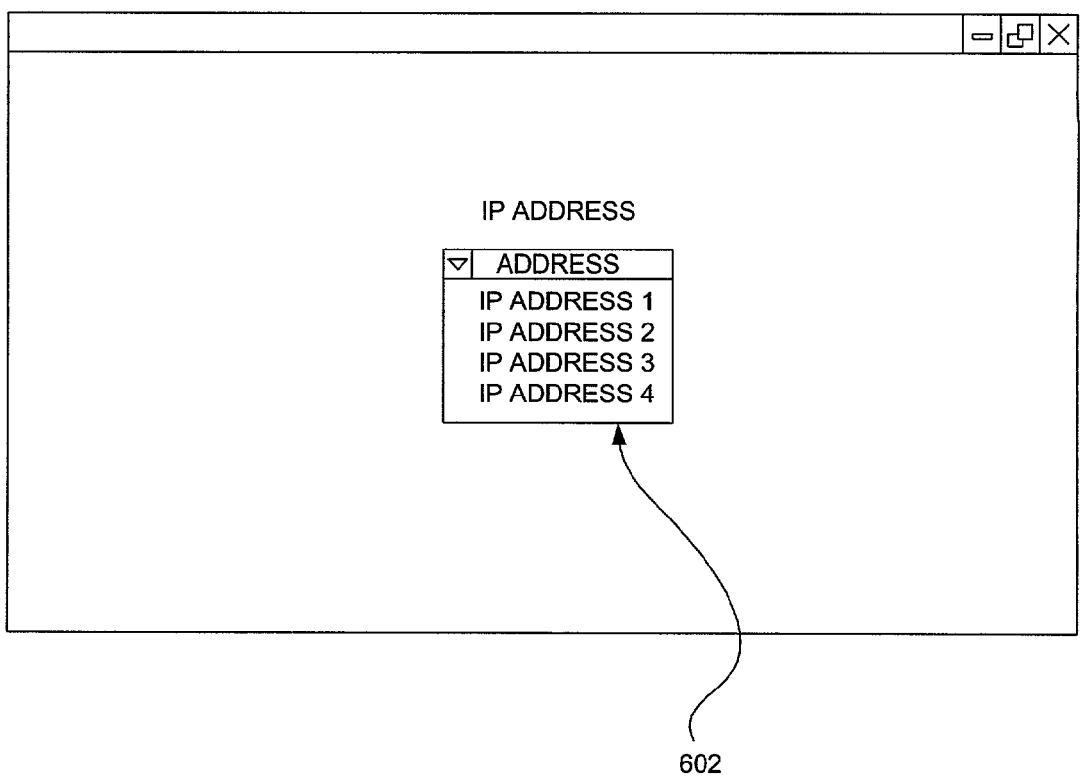
FIG. 6 illustrates a configuration interface with an exemplary drop-down menu for displaying IP address match(es), in accordance with one exemplary embodiment.

In any case, any match or matches are displayed in a drop-down menu in operation 314 so that they are available for selection by the user. FIG. 6 illustrates a configuration interface 600 with an exemplary drop-down menu 602 for displaying the IP address match(es), in accordance with one exemplary embodiment. Of course, the match or matches may be displayed in any desired manner that makes them readily available for selection by the user.

Thus, as is now apparent, the present method 300 attempts to retrieve a match from a cache before contacting the DNS server. Thus network bandwidth is conserved, and the present method 300 is made more efficient.

If any of the displayed matches are not selected (as determined by decision 316), the present method 300 may be continued by receiving an additional character from the user in operation 304. If either one of the displayed matches or a manually entered IP address is selected, such IP address is cached or stored in a host file in operation 318 for the purpose of being used later, as indicated in decision 306.

Next, in operation 320, the configuration data including the selected IP address is applied. Thereafter, data communicated using the IP address is processed in operation 322. In the context of a security program, this may involve scanning such data for malware (i.e. intrusions, viruses, etc.).

Thus, an 'intelligent translation' process is provided to improve usability to at least some degree. Such process may 'auto-complete' IP addresses as and when they are typed into the appropriate fields. For example, if the user is typing 192.168.3.55 (an IP address of a recipient) a background application may be referencing the DNS server for matches for "192." If any matches are found, the IP address and the corresponding hostname may be displayed in a 'drop-down' menu box from which the user may select. This may also work if the user were to type an IPv6 address in the text window, which would be very beneficial as the IPv6 address format is longer and more confusing than a standard decimal format.

Figure 7:
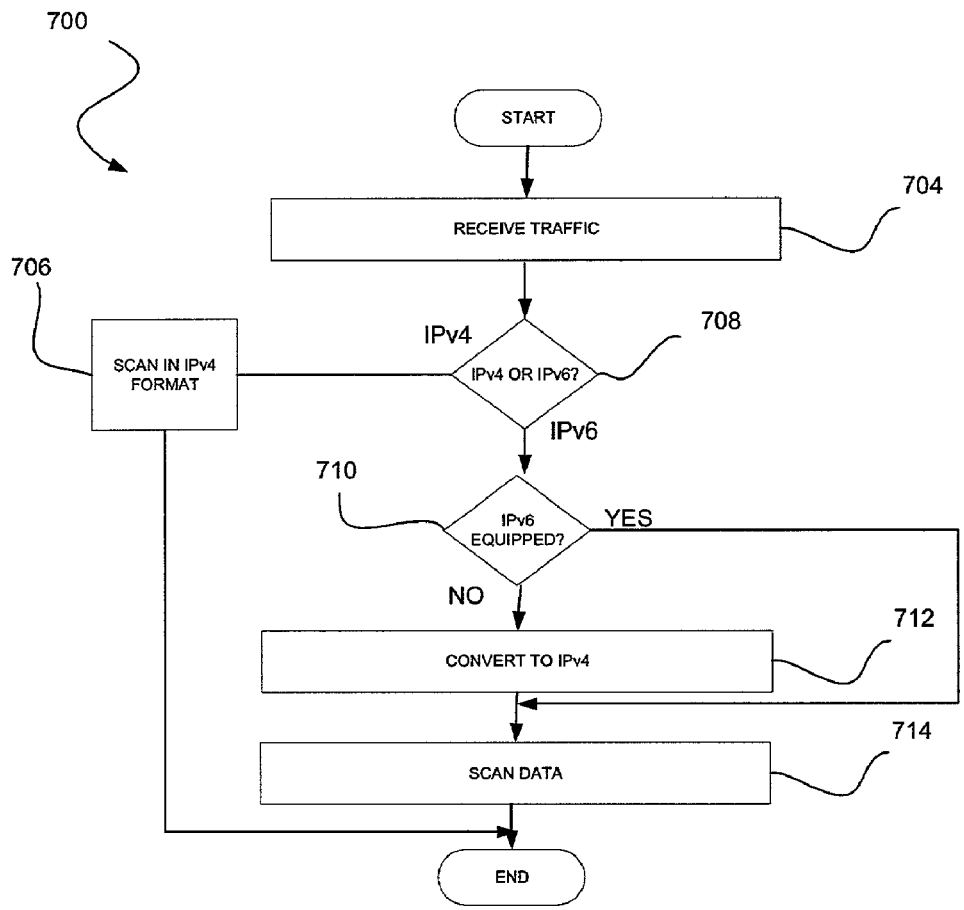
FIG. 7 shows a method for translating between IP's.

FIG. 7 shows a method 700 for translating between Internet Protocols (IP's). In use, the present method 700 may be used to facilitate the processing of data that is received over the Internet utilizing IP's (i.e. IPv6). It should be noted that the present method 700 may be used separately or in conjunction with the foregoing method of FIG. 3.

As shown in FIG. 7, data is initially received over the Internet in operation 704. Such data is adapted for being processed by an application program. It should be noted that the application program may be capable of processing only a certain type of IP (i.e. IPv4).

Next, it is determined in decision 708 whether the data is received over the Internet utilizing a first IP (i.e. IPv6) or a second IP (i.e. IPv4). This may be accomplished by simply inspecting an associated IP address or any other distinguishing aspect of the communication of the data.

If it is determined that the data is received over the Internet utilizing the second IP, the data is processed utilizing the second IP, since the application program is capable of such operation. See operation 706. If, on the other hand, it is determined in decision 708 that the data is received over the Internet utilizing the first IP, further processing takes place. See decision 710.

In particular, it is determined in decision 710 whether the application program can process data received over the Internet utilizing the first IP. If it is determined that the application program can not process data received over the Internet utilizing the first IP, the data is converted from the first IP to the second IP that the application program is capable of processing. See operation 712. Thereafter, the data is ready to be processed in the second IP format.

In one embodiment, the present functionality may be accomplished by an application program "wrapper" that translates between the IPv4 and IPv6 address formats. For example, following the user entering an IPv4 address or hostname into a field when setting configuration data (see FIGS. 3-6), the conversion translates this address into an IPv6 format (if such an address exists for the recipient) and sends the modified IP packet via the Internet. The aforementioned conversion may also occur by referencing a DNS server, which contains both IPv4 and IPv6 addresses that map to the hostname of the recipient.

Of course, if it is determined that the application program can process data received over the Internet utilizing the first IP, the data is simply processed utilizing the first IP. See operation 714.

In an alternate embodiment where the application program or "wrapped" application program is capable of processing any type of IP (i.e. IPv4, IPv6, etc.), operations 710 and 712 may be excluded. In particular, data may be received over the Internet for being processed by an application program. It may then be determined whether the data is received over the Internet utilizing a first IP or a second IP. If it is determined that the data is received over the Internet utilizing the first IP, the data is processed utilizing the first IP. Further, if it is determined that the data is received over the Internet utilizing the second IP, the data is processed utilizing the second IP.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for translating between Internet Protocols (IP's), comprising:

receiving data over the Internet utilizing a first IP for being processed by an application program;

determining whether the application program can process the data received over the Internet utilizing the first IP; and if it is determined that the application program can not process the data received over the Internet utilizing the first IP, converting the data from the first IP to a second IP for processing the data utilizing the application program;

wherein if it is determined that the application program can process the data received over the Internet utilizing the first IP, the data received over the Internet is processed utilizing, the first IP.

2. The method as recited in claim 1, wherein the first IP includes IPv6 and the second IP includes IPv4.

3. The method as recited in claim 1, wherein if it is determined that the application program can not process the data received over the Internet utilizing the first IP, further comprising processing the converted data received over the Internet utilizing the second IP.

4. The method as recited in claim 1, wherein the application program is wrapped with a wrapper that converts the data from the first IP to the second IP for processing the data utilizing the application program.

5. A computer program product embodied on a tangible computer readable medium for translating between Internet Protocols (IP's), comprising:

computer code for receiving data over the Internet utilizing a first IP for being processed by an application program;

computer code for determining whether the application program can process the data received over the Internet utilizing the first IP; and computer code for converting the data from the first IP to a second IP for processing the data utilizing the application program, if it is determined that the application program can not process the data received over the Internet utilizing the first IP;

computer code for processing the data received over the Internet utilizing the first IP, if it is determined that the application program can process the data received over the Internet utilizing the first IP.

6. A method for translating between Internet Protocols (IP's), comprising:

receiving data over the Internet for being processed by an application program;

determining whether the data is received over the Internet utilizing a first IP or a second IP, wherein the first IP includes IPv6 and the second IP includes IPv4;

if it is determined that the data is received over the Internet utilizing the second IP, processing the data utilizing the second IP;

if it is determined that the data is received over the Internet utilizing the first IP, determining whether the application program can process the data received over the Internet utilizing the first IP;

if it is determined that the application program can process the data received over the Internet utilizing the first IP, processing the data utilizing the first IP; and if it is determined that the application program can not process the data received over the Internet utilizing the first IP, converting the data from the first IP to the second IP, and processing the data utilizing the second IP.

* * * * *

UNITED STATES PATENT AND TRADEMARK OFFICE
CERTIFICATE OF CORRECTION

PATENT NO. : 7,440,471 B1 Page 1 of 1
APPLICATION NO. : 10/124955
DATED : October 21, 2008
INVENTOR(S) : Alex Hinchliffe et al.

It is certified that error appears in the above-identified patent and that said Letters Patent is hereby corrected as shown below:

In the Claims:

Col. 7, line 5 replace "IP," with --IP;--

Signed and Sealed this

Eighteenth Day of May, 2010

David J. Kappos
*Director of the United States Patent and Trademark Office*